(12) United States Patent
Emori

(10) Patent No.: US 8,577,964 B2
(45) Date of Patent: Nov. 5, 2013

(54) NETWORK DEVICE MANAGEMENT UNIT, NETWORK DEVICE MANAGEMENT SYSTEM AND COMMUNICATION MANAGEMENT UNIT

(75) Inventor: Mototsugu Emori, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 882 days.

(21) Appl. No.: 12/564,655

(22) Filed: Sep. 22, 2009

(65) Prior Publication Data

US 2010/0169468 A1 Jul. 1, 2010

(30) Foreign Application Priority Data

Sep. 30, 2008 (JP) ................................. 2008-252631

(51) Int. Cl.
  *G06F 15/16* (2006.01)
(52) U.S. Cl.
  USPC .......................................... 709/204; 370/265
(58) Field of Classification Search
  USPC ............................. 709/204, 227; 370/264, 265
  See application file for complete search history.

(56) References Cited

U.S. PATENT DOCUMENTS

| 7,443,834 | B1 * | 10/2008 | Sylvain ........................ | 370/352 |
| 8,116,286 | B2 * | 2/2012 | Sylvain ........................ | 370/338 |
| 8,131,858 | B2 * | 3/2012 | Agulnik et al. ............... | 709/227 |
| 2006/0092922 | A1 * | 5/2006 | Kobayashi et al. ........... | 370/352 |
| 2008/0068649 | A1 | 3/2008 | Emori | |
| 2009/0006533 | A1 * | 1/2009 | Guo ............................. | 709/203 |
| 2010/0135183 | A1 * | 6/2010 | Suzuki et al. ................. | 370/252 |
| 2011/0289201 | A1 * | 11/2011 | Lochbaum et al. ........... | 709/223 |

FOREIGN PATENT DOCUMENTS

| JP | 2000-174925 | 6/2000 |
| JP | 2006-135448 | 5/2006 |
| JP | 2006-135954 | 5/2006 |
| JP | 2006-319697 | 11/2006 |
| JP | 2007-158862 | 6/2007 |

OTHER PUBLICATIONS

Japanese Patent Office Communication issued on Jan. 29, 2013 for Japanese Patent Application No. 2008-252631.

* cited by examiner

*Primary Examiner* — Kevin Bates
(74) *Attorney, Agent, or Firm* — Oblon, Spivak, McClelland, Maier & Neustadt, L.L.P.

(57) ABSTRACT

A network device management unit manages a first network device, communicable with a second network device, managed by a counterpart network device management unit, in a network environment. The network device management includes a device information storage, a communication-start information, a network device management information operation unit, an available function information acquisition unit, and a display-information generator. The device information storage stores network device management information of the first network device. The communication-start information acquisition unit obtains communication-start information when the first and second network devices start to communicate. The network device management information operation unit lets the counterpart network device management unit to obtain the network device management information of the first network device. The available function information acquisition unit obtains available function information of the second network device. The display-information generator generates networked-device-function information corresponds to the obtained available function information.

23 Claims, 14 Drawing Sheets

| TYPE | DEVICE | SERVICE | MEDIA | URI | USER | PASSWORD |
|---|---|---|---|---|---|---|
| IMAGE VIEWER | Viewer1 | IMAGE COMMUNICATION | video/passive | sip:viewer@***.co.jp | viewer1 | viewer1_pass |
| IP PHONE | TEL1 | AUDIO COMMUNICATION | audio | sip:001@***.co.jp | tel1 | tel1_pass |
| WEB CAMERA | NetCam1 | — | video/active | sip:netcam1@***.co.jp | netcam1 | netcam1_pass |
| ... | | | | | | |

FIG. 5A

| DEVICE | Controller1 |
|---|---|
| TYPE | control |
| URI | sip:controller1@***.co.jp |
| IP ADDRESS | *.*.*.* |
| PORT NO. | **** |
| USER | controller1 |
| PASSWORD | controller1_pass |

FIG. 5B

| DEVICE | Viewer1 |
|---|---|
| TYPE | video/passive |
| URI | sip:viewer1@***.co.jp |
| IP ADDRESS | *.*.*.* |
| PORT NO. | **** |
| USER | viewer1 |
| PASSWORD | viewer1_pass |

FIG. 5C

| DEVICE | TEL1 |
|---|---|
| TYPE | audio |
| URI | sip:001@***.co.jp |
| IP ADDRESS | *.*.*.* |
| PORT NO. | **** |
| USER | tel1 |
| PASSWORD | tel1_pass |

FIG. 5D

| DEVICE | NetCam1 |
|---|---|
| TYPE | video/active |
| URI | sip:netcam1@***.co.jp |
| IP ADDRESS | *.*.*.* |
| PORT NO. | **** |
| USER | netcam1 |
| PASSWORD | netcam1_pass |

| DEVICE | USER | PASSWORD | |
|---|---|---|---|
| Viewer1 | viewer1 | viewer1_pass | |
| TEL1 | tel1 | tel1_pass | ⋯ |
| NetCam1 | netcam1 | netcam1_pass | |
| ⋮ | | | |

| URI OF CONTROLLER | URI OF COMMUNICATION DEVICE |
|---|---|
| sip:controller1@*.co.jp | sip:viewer1@*.co.jp |
| | sip:001@***.co.jp |
| | sip:netcam1@***.co.jp |
| | sip:011@***.co.jp |
| sip:controller2@*.co.jp | sip:viewer2@*.co.jp |
| | sip:002@***.co.jp |
| | sip:netcam2@***.co.jp |

FIG. 18

| AREA | TYPE | DEVICE | SERVICE | MEDIA | URI | USER | PASSWORD |
|---|---|---|---|---|---|---|---|
| A | IP PHONE | TEL1 | IMAGE COMMUNICATION | audio | sip:001@***.co.jp | tel1 | tel1_pass |
| B | IP PHONE | TEL1 | AUDIO COMMUNICATION | audio | sip:002@***.co.jp | tel2 | tel2_pass |
| B | PRINTER | Printer2 | PRINTER CHECK | http/passive | http://printer2.***.co.jp | — | — |
| | | | | ... | | | |

NETWORK DEVICE MANAGEMENT UNIT, NETWORK DEVICE MANAGEMENT SYSTEM AND COMMUNICATION MANAGEMENT UNIT

CROSS-REFERENCE TO RELATED APPLICATIONS

This application claims priority to Japanese Patent Application No. 2008-252631, filed on Sep. 30, 2008 in the Japan Patent Office, which is hereby incorporated by reference herein in its entirety.

BACKGROUND OF THE INVENTION

1. Field of the Invention

The present invention relates to a network device management unit, a network device management system, and a communication management unit, and more particularly, to consolidated management of devices connectable to each other and operable in a network environment.

2. Description of the Background Art

Recently, Internet telephony technology, connecting at least two telephone units via an IP network (Internet Protocol network), has become available. For example, VoIP (Voice over IP) can be used for IP phone communication between telephone units. VoIP is implemented by SIP (Session Initiation Protocol), H.323, or the like. SIP in particularly is widely applicable not only to VoIP but also to other real-time communication systems that use signaling control process.

Further, SIP will be adopted as the standard protocol for a so-called NGN (Next Generation Network), which is now undergoing standardization. SIP is used to start a communication between terminal devices, or one terminal device and a server, in an NGN environment. In the NGN environment, terminal devices such as a telephone or the like may be controlled or managed by SIP. With such configuration, multiple services can be seamlessly organized.

For example, in households, a cell-phone can be used as a cordless handset of a land-line phone, by which a service charge can be reduced. Further, a triple play service such as using TV phones, viewing image contents, and viewing a web page at the same time can be made available.

JP-2006-135954-A discusses a method of providing services by using signaling control, in which a television conference system is devised by combining a voice communication device, connected to a telephone network, and a video/image communication device, connected to a public line network such as the Internet.

Further, JP-2006-319697-A discusses a method of establishing sessions for image processing devices connected to corresponding IP phones when sessions for IP phones are established.

Recently, several services such as telephone, facsimile, IM (instant messenger), and television conferencing can be implemented using SIP and communication devices such as a real-time communication device. The number or types of such communication devices is increasing, providing users with a variety of services to increase user convenience for information handling. However, because such communication devices are provided by multiple vendors, it becomes difficult to set up a more effective communication environment that can link these various services.

For example, typically available television conference systems use a voice communication system and a video/image communication system as one combination. However, the voice communication system and the video/image communication system are typically provided by multiple vendors using unique systems, by which a television conference system composed of a combination of multiple systems may be hard to implement. Further, with the above-mentioned triple-play service, each household must install a set-top-box having the same functions.

JP-2006-135954-A and JP-2006-319697-A disclose methods of providing one service by linking a plurality of different devices. However, JP-2006-135954-A aims for a TV phone, which combines a telephone and a television, and therefore devices other than telephones and televisions may not be employed in such system. Further, JP-2006-319697-A requires that special processing is carried out by each device.

SUMMARY

In one aspect of the present invention, a network device management unit is devised. The network device management unit manages a first network device connectable to and operable in a network environment. The first network device is communicable with a second network device, disposed on the network and managed by a counterpart network device management unit. The second network device used as a counterpart network device for the first network device. The network device management includes a device information storage, a communication-start information, a network device management information operation unit, an available function information acquisition unit, and a display-information generator. The device information storage stores network device management information set for the first network device. The communication-start information acquisition unit obtains communication-start information when the first and second network devices start to communicate with each other. The network device management information operation unit lets the counterpart network device management unit, managing the second network device, obtain the network device management information of the first network device after the communication-start information is obtained. The available function information acquisition unit obtains available function information, providable by the second network device managed by the counterpart network device management unit, after the communication-start information is obtained. The display-information generator generates networked-device-function information as displayable information based on the obtained available function information. The networked-device-function information corresponds to the obtained available function information.

In another aspect of the present invention, a network device management system to manage communication of network devices on a network environment is devised. The network device management system includes a first network device, a first network device management unit, a second network device, a second network device management unit, and a communication management unit. The first network device is connected to and operated with the network. The first network device management unit manages the first network device. The second network device, connected to and operated with the network, is communicable with the first network device. The second network device is used as a counterpart network device for the first network device. The second network device management unit manages the second network device. The second network device management unit is used as a counterpart network device management unit for the first network device management unit. The communication management unit notifies a communication start between the first network device and the second network device to the first network device management unit. The first network device management unit includes a device information storage, a network device management information transmitting unit, an available function information acquisition unit, and a display-information generator. The device information storage stores network device management information set for the first network device. The network device management information transmitting unit transmits the network device management information of the first network device to the second network device management unit upon a notification from the communication management unit. The available function information acquisition unit obtains available function information, providable by the second network device unit, upon a notification from the communication management unit. The display-information generator generates networked-device-function information as displayable information based on the obtained available function information, the networked-device-function information corresponds to the available function information.

In another aspect of the present invention, a communication management unit for managing communication between a first network device and a second network device connected to and operated with a network environment is devised. The first network device and the second network device are managed respectively by a first network device management unit and a second network device management unit. The communication management unit includes a communication-start information acquisition unit, and a communication-start information transmitting unit. The communication-start information acquisition unit obtains communication-start information indicating start of communication between the first network device and second network device. The communication-start information transmitting unit transmits the communication-start information to at least one of the first network device management unit and the second network device management unit after the communication-start information is obtained.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 shows example device-setting information for network devices;

FIG. 18 shows example information stored in communication device information storage according to a third example embodiment;

Figure 1:
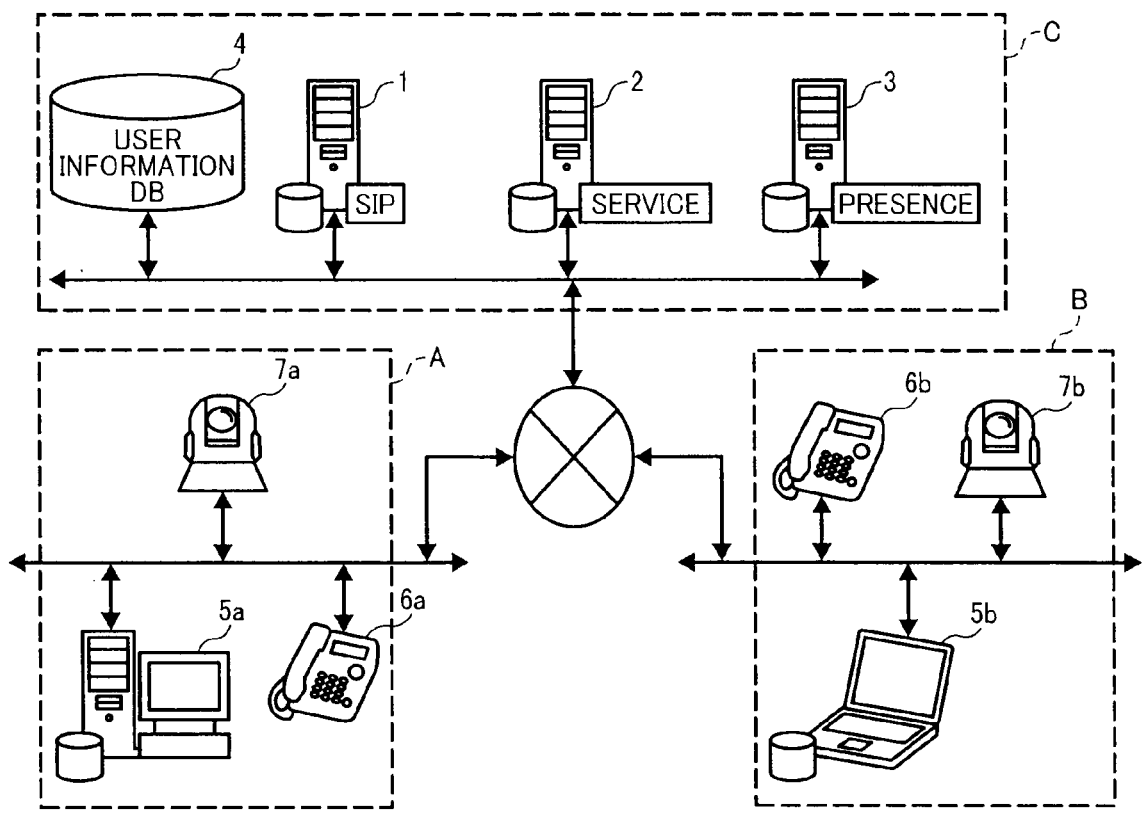
FIG. 1 illustrates an example configuration of communication management system according to a first example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing expanded views shown in the drawings, specific terminology is employed for the sake of clarity, the present disclosure is not limited to the specific terminology so selected and it is to be understood that each specific element includes all technical equivalents that operate in a similar manner.

Referring now to the drawings, a communication management system according to an exemplary embodiment is described.

In a first example embodiment, a description is given to a communication management system, which can conduct a consolidated management for communication devices coupled or connected to different or multiple networks.

FIG. 1 shows one example configuration for a communication management system according to a first example embodiment. For example, three networks A, B, and C are coupled or connected to each other via a public line network (e.g., the Internet). Each of the networks A and B may be used as a user's network, in which a user may use services providable by the communication management system. The network C may be used as a system provider's network, which provides functions to perform the communication management system.

The network C may include a SIP server (session initiation protocol server) server 1, a service management server 2, a presence server 3, and a user information DB (data base) 4, which are coupled or connected each other, for example.

The SIP server 1 controls an establishment of signaling and session when network devices included in the networks A and B start to communicate information. Accordingly, the SIP server 1 may function as a signaling server. The SIP server 1 stores URI (uniform resource identifier), which can uniquely identify a given address of destination on the network, and information of IP address and port number associated to the URI. Such information of IP address and port number associated to the URI may be referred to as URI solution information, hereinafter. Accordingly, the SIP server 1 can recognize IP address and port number based on the URI solution information. The network devices included in the network A may be connected each other, and the network devices included in the network B may be connected each other. Further, the network devices included in the networks A and B may be connected each other via networks. Accordingly, network devices can be connected each other within one network and over other network, for example.

The service management server 2 manages information of network devices included in each the network A and B. The service management server 2 will be described in detail later.

The presence server 3 monitors status of network devices included in the networks A and B. Accordingly, the presence server 3 may function as a status-monitoring server.

The user information DB 4 stores user names and corresponding passwords assigned to each one of network devices included in the networks A and B, as required. In FIG. 1, the user information DB 4 is disposed as an independent device in the network C. However, the user information DB 4 can be integrated with the SIP server 1, for example.

The network A may include a PC (personal computer) 5a, an IP phone 6a, and a web camera 7a, which are coupled or connected each other, for example. Further, the network B may include a PC 5b, an IP phone 6b, and a web camera 7b, which are coupled or connected each other, for example. Hereinafter, the PC 5a, the IP phone 6a, and the web camera 7a included in the network A are explained. The PC 5b, the IP phone 6b, and the web camera 7b included in the network B function similarly as the PC 5a, the IP phone 6a, and the web camera 7a.

Figure 2:
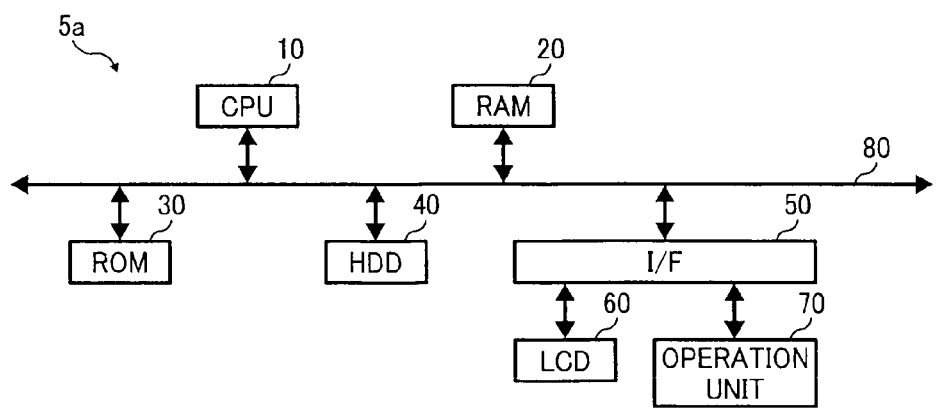
FIG. 2 illustrates a hardware configuration of personal computer.

The PC 5a is an information-processing terminal, which is used by a user, who uses network devices connected to the network A. FIG. 2 shows a hardware configuration of the PC 5a. As shown in FIG. 2, the PC 5a may include a configuration as similar to a typical information processing terminal.

For example, the PC 5a may include a CPU (central processing unit) 10, a RAM (random access memory) 20, a ROM (read only memory) 30, a HDD (hard disk drive) 40, and an I/F (interface) 50, which are coupled or connected each other via a bus 80. Further, the I/F 50 may be coupled or connected to a LCD (liquid crystal display) 60, and an operation unit 70, for example.

The CPU 10 is used as a computing unit, and controls the PC 5a as a whole. The RAM 20 is a volatile memory, to which information can be read and written at a higher speed, and used as a working memory when the CPU 10 processes information. The ROM 30 is a non-volatile memory, which can be used as a read only memory, in which a program such as firmware may be stored. The HDD 40 is a non-volatile memory, to which information can be read and written, and may store OS (operating system), various control programs, application programs, for example.

The I/F 50 connects the bus 80 and various hardwares and networks, and controls information communication. The LCD 60 is used as a visual user interface, by which a user can check status of the PC 5a. The operation unit 70 may be used as a, by which a user can input information to the PC 5a, wherein the user interface may include a key board, a mouse, or the like.

In such hardware configuration, a program stored in a memory (e.g., ROM 30, HDD 40, optical disk) is read on the RAM 20, and then the CPU 10 executes the program. By combining software and hardware control, the PC 5a can establish a functional block to realize its designed function. Further, the service management server 2 may include a hardware configuration as similar to FIG. 2, but user interfaces such as LCD 60 and operation unit 70 can be omitted.

Figures 3, 4:
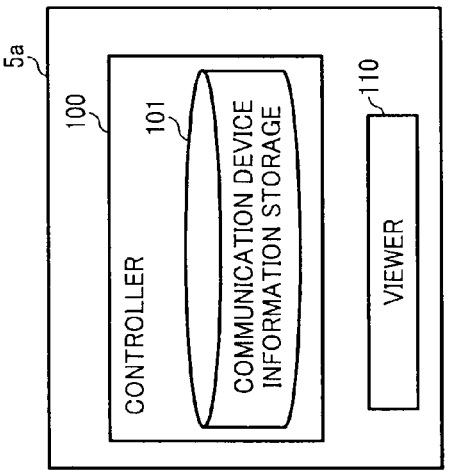
FIG. 3 illustrates a functional configuration of personal computer of FIG. 2.
FIG. 4 shows example information stored in a communication device information storage.

A description is now given to a functional configuration of the PC 5a with reference to FIG. 3. As shown in FIG. 3, the PC 5a may include a controller 100 and a viewer 110, for example. The controller 100 may consolidatedly manage network devices coupled to the network A. Accordingly, the controller 100 may function as a network device management unit. The controller 100 may function as the network device management unit when the CPU 10 executes a program loaded on the RAM 20 (see FIG. 2).

As shown in FIG. 3, the controller 100 may include a communication device information storage 101. The communication device information storage 101 is used as a database for storing information of network devices coupled to the network A. Accordingly, the communication device information storage 101 may function as a devise information storage for storing devise information. The device information storage may be configured as the HDD 40 as shown in FIG. 2, for example.

As shown in FIG. 4, the communication device information storage 101 may store information related to communication devices, which may be referred to as communication device information, hereinafter. As shown in FIG. 4, the communication device information storage 101 may store communication device information such as type name, device name, service name, media type, URI, user name and corresponding password, for example. The URI include identification information to uniquely identify a combination of address and port number in a network.

In FIG. 4, information of the viewer 110, IP phone 6a, and web camera 7a are registered, for example. A user can add, delete, and change communication device information shown in FIG. 4 by using the PC 5a. With such a configuration, a network device can be added to the communication management system; a network device can be deleted from the communication management system; a network device to be connected to the communication management system can be changed; and information of connected network device can be registered.

In such configuration, the controller 100 may function as a device management information editor. The controller 100 may function as the device management information editor when the CPU 10 executes a program loaded on the RAM 20 (see FIG. 2).

The viewer 110 can display an image taken by a web camera connected to another network when the SIP server 1 conducts signaling. For example, the viewer 110 installed in the PC 5a in the network A may display an image taken by the web camera 7b included in the network B. Although the controller 100 and the viewer 110 are disposed in the PC 5a, the controller 100 and the viewer 110 can be separately disposed in different apparatuses.

The IP phone 6a can conduct voice communication with another IP phone when the SIP server 1 conducts signaling. The web camera 7a can transmit an image to a viewer connected to another network when the SIP server 1 conducts signaling. For example, the web camera 7a disposed in the network A may transmit an image to a viewer installed in the PC 5b disposed in the network B.

Further, as shown in FIG. 1, a voice communication can be realized by the IP phone 6a. Further, an application of voice communication can be installed in the PC 5a. As such, the voice communication function can be installed in the PC 5a as similar to installing the viewer 110 in the PC 5a.

Each of network devices coupled or connected to the network A may store device-setting information respectively. In the above-described configuration, the controller 100 and the viewer 110 may be installed in same terminal device such as PC 5a. Because the controller 100 and the viewer 110 provide different functions, the controller 100 and the viewer 110 will be explained as different network devices.

FIGS. 5A to 5D show example device-setting information stored for each of the network devices coupled to the network A. Specifically, FIG. 5A shows device-setting information stored for the controller 100, FIG. 5B shows device-setting information stored for the viewer 110, FIG. 5C shows device-setting information stored for the IP phone 6a, and FIG. 5D shows device-setting information stored for the web camera 7a.

As shown in FIG. 5A, device-setting information may include information of device name, service type to be provided by device, URI, IP address, port number, user name and corresponding password, for example.

A description is now given to an operation of the communication management system. In the communication management system, based on communication device information stored in the communication device information storage 101, the controller 100 registers information, which correlates the controller 100 and other network devices, to the service management server 2. Hereinafter, such information is referred to as related-information. A registration process of related-information is described with reference to FIG. 6.

Figures 6, 7, 8:
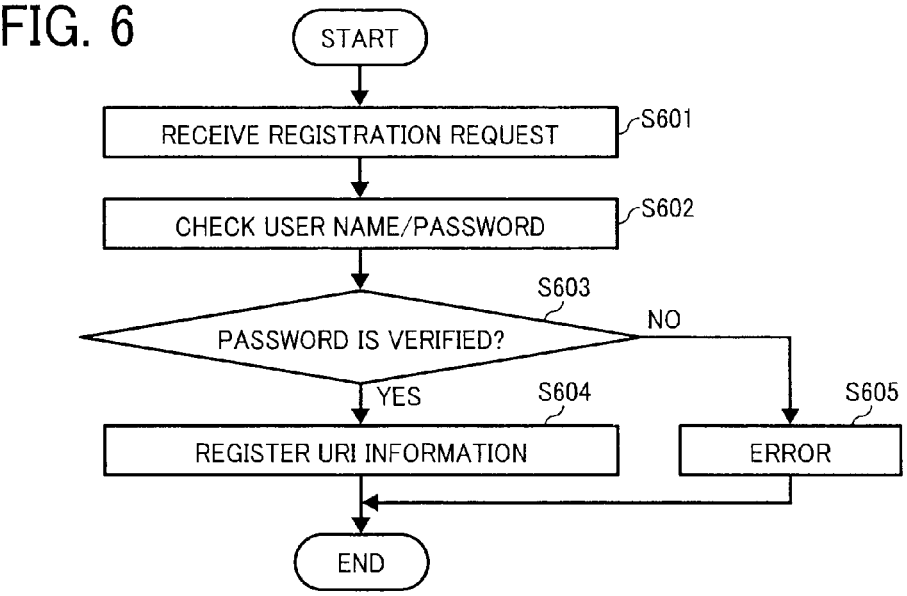
FIG. 6 shows a flowchart for registering related-information.
FIG. 7 shows example information stored in a user information DB.
FIG. 8 shows example related-information.

FIG. 6 shows a flowchart of registration process of related-information, in which the service management server 2 registers related-information with a request from the controller 100. The processes shown in FIG. 6 may be conducted in response to a request from the controller 100 installed in the PC 5a and PC 5b.

At step S601, the service management server 2 receives a registration request from the controller 100.

Accordingly, the controller 100 may function as a related-information registration unit. The controller 100 may function as the related-information registration unit when the CPU 10 executes a program loaded on the RAM 20 (see FIG. 2).

At step S601, the service management server 2 receives the registration request, which may include URI information of the controller 100, and URI information of network devices stored in the communication device information storage 101, wherein the network devices are managed or controlled by the controller 100. When the service management server 2 receives the registration request, the service management server 2 checks user name and corresponding password of the network devices to confirm whether the controller 100 has management authority of each of network devices at step S602.

At step S602, the service management server 2 refers to the user information DB 4 to check and verify user name and corresponding password. FIG. 7 shows example information stored in the user information DB 4. As shown in FIG. 7, the user information DB 4 stores information of device name, user name and corresponding password, for example. Accordingly, the user information DB 4 may function as a verification information storage. Information shown in FIG. 7 may be registered by a user in advance, and used to communicate each of network devices each other using the SIP server 1. The user name and corresponding password can be checked using HTTP (Hypertext Transfer Protocol) Digest Authentication or the like, for example.

If the user name and corresponding password are checked at step S602 and verified at step S603 (Yes at step S603), the service management server 2 correlates URI information of the controller 100, which is a source of registration request, and URI information of a network device verified by the step S603, and stores such related-information at step S604, and ends the process.

On one hand, if the user name and corresponding password are not verified at step S603 (No at step S603), the service management server 2 determines that an error occurs at step S605, and ends the process, without registering URI information.

FIG. 8 shows example related-information stored at S604 in FIG. 6. As shown in FIG. 8, the service management server 2 stores related-information, which correlates URI of the controller 100 and URI of the network devices managed by the controller 100. With such a configuration, when one of network devices starts a communication process, a communication notice can be informed to the controller 100, which manages the concerned network device. In such configuration, the service management server 2 may function as a related-information storage. The service management server 2 may function as the related-information storage when the CPU 10 executes a program loaded on the RAM 20 (see FIG. 2).

A description is now given to one example operation process of the communication management system. In an example embodiment, when the IP phone 6a and the IP phone 6b start a voice communication, the controller 100 in the PC 5a, and the controller 100 in 5b may display available services, and may start a video/ image communication using a web camera. In the present invention, the terms of available service and available function may be interchangeably used.

Figure 9:
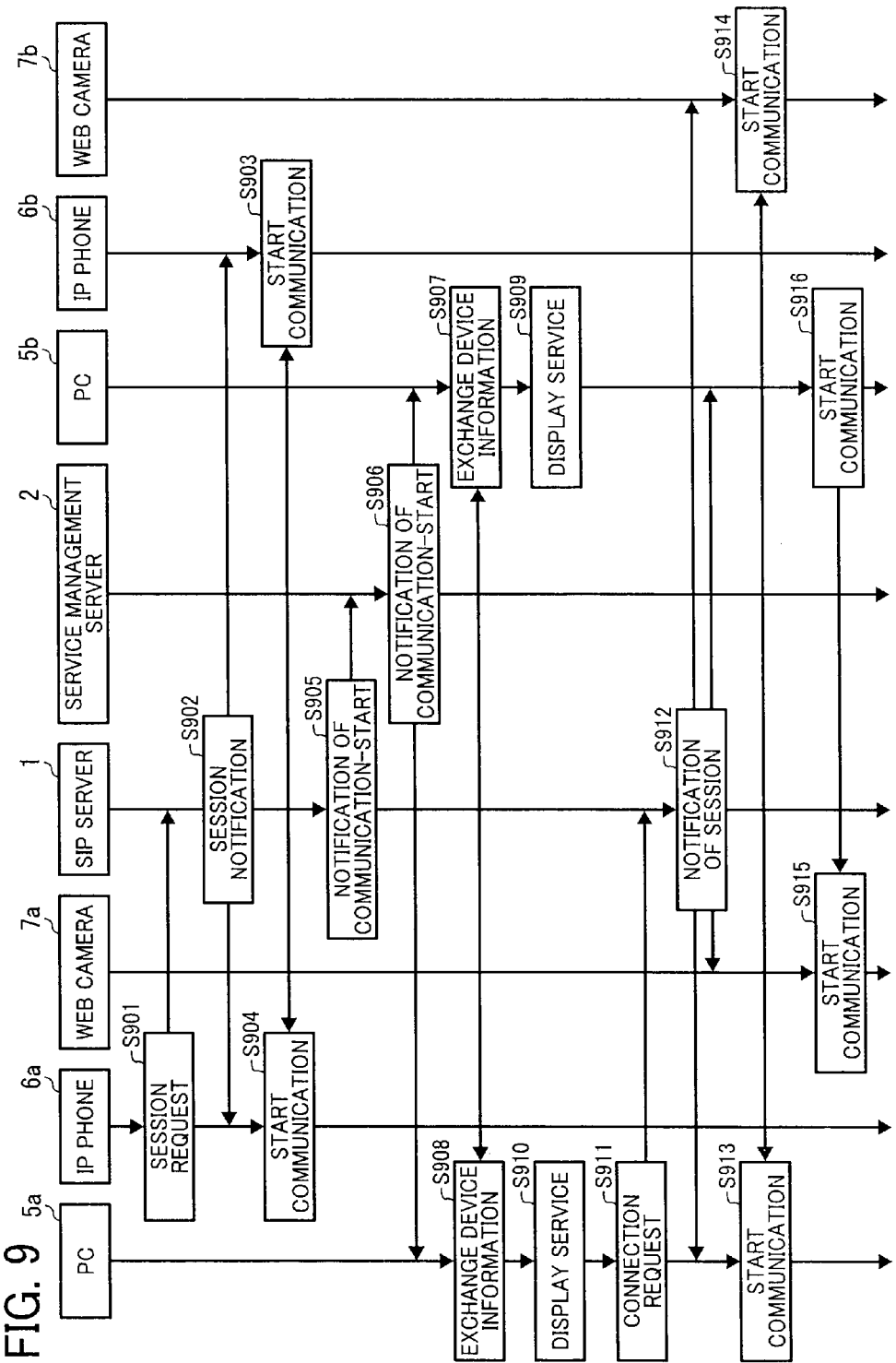
FIG. 9 shows a sequence chart of one example operation process of the communication management system according to a first example embodiment.

FIG. 9 shows a sequence chart of one example operation process of the communication management system, in which the IP phone 6a may be used as a process-initiation terminal, which transmits a given signal at first. As shown in FIG. 9, the IP phone 6a transmits a session request to the SIP server 1 (step S901). At step S901, the IP phone 6a conducts the session request by notifying URI of the IP phone 6a, and URI of the IP phone 6b to the SIP server 1, in which the IP phone 6b is a counterpart phone unit for the IP phone 6a, which requests a start of communication with the IP phone 6b.

Figure 10:
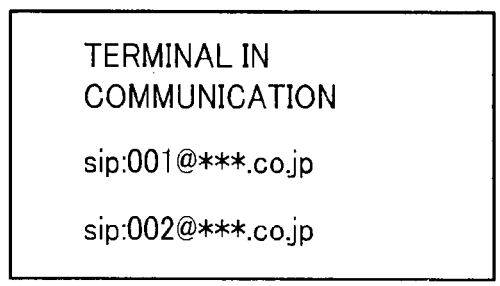
FIG. 10 shows example information indicating that network devices are communicating each other.

After receiving the session request, the SIP server 1 obtains IP address and port number corresponding to the notified URI from the URI solution information stored in the SIP server 1, and then the SIP server 1 transmits a session notification to the IP phones 6a and 6b (step S902). With such a process, the IP phones 6a and 6b start a communication (step S903, S904). When the IP phones 6a and 6b start communication, the SIP server 1 stores URI information of the IP phones 6a and 6b as information of terminal devices that are under communication as shown in FIG. 10. Such terminal devices may be referred communication-in-progress device.

Then, The SIP server 1 notifies the start of communication between the IP phones 6a and IP phone 6b to the service management server 2 (step S905). At step S905, the service management server 2 may function as a communication-start information acquisition unit. The service management server 2 may function as the communication-start information acquisition unit when the CPU 10 executes a program loaded on the RAM 20 (see FIG. 2).

At step S905, the SIP server 1 transmits information, shown in FIG. 10, to the service management server 2 to notify the start of communication between the IP phones 6a and 6b. When the service management server 2 receives a notification of the start of communication, the service management server 2 refers to the related-information shown in FIG. 8 to obtain URI information of the controller 100, which controls or manages the IP phone 6a or IP phone 6b.

In an example embodiment, the controller 100 installed in the PC 5a controls the IP phone 6a and has a URI of "sip:controller1@xxx.co.jp." Further, the controller 100 installed in the PC 5b controls the IP phone 6b and has a URI of "sip:controller2@xxx.co.jp." Hereinafter, the controller 100 installed in the PC 5a may be referred to as the controller 100a, and the controller 100 installed in the PC 5b may be referred to as the controller 100b.

When the service management server 2 obtains URI information of the controller 100a and the controller 100b, the service management server 2 notifies the start of communication between the IP phones 6a and 6b to the controller 100a and the controller 100b (step S906). At step S906, the service management server 2 notifies the information shown in FIG. 10 and URI information of counterpart controller. The controller 100a and the controller 100b are counterpart controllers each other. Accordingly, at step S906, the service management server 2 may function as a communication-start information transmitting unit. The service management server 2 may function as the communication-start information transmitting unit when the CPU 10 executes a program loaded on the RAM 20 (see FIG. 2).

Accordingly, at step S906, the service management server 2 notifies the information shown in FIG. 10 and URI information of the controller 100b to the controller 100a; and also the service management server 2 notifies the information shown in FIG. 10 and URI information of the controller 100a to the controller 100b. Information obtained by the controllers 100a and 100b at step S906 can be used as communication-start information. Accordingly, the controllers 100a and 100b may function as a communication-start information acquisition unit. The controllers 100a and 100b may function as the communication-start information acquisition unit when the CPU 10 executes a program loaded on the RAM 20 (see FIG. 2).

Further, at step S906, the service management server 2 obtains IP address and port number of the controller 100a and the controller 100b from the SIP server 1 based on URI information of the controller 100a and the controller 100b, by which the service management server 2 can transmit information to the controller 100a and the controller 100b.

After receiving notification of communication-start between the IP phones 6a and 6b from the service management server 2, the controller 100a and the controller 100b exchange information of network devices managed by the controller 100a and the controller 100b (step S907, S908). For example, the controller 100a transmits information of network devices managed by the controller 100a to the controller 100b, and the controller 100b transmits information of network devices managed by the controller 100b to the controller 100a. At steps S907 and S908, the controllers 100a and 100b exchange information of communication device (referred to as communication device information) shown in FIG. 4, which is managed by the controller 100a and the controller 100b.

In an example case of FIG. 9, the IP phone 6a and the IP phone 6b has started a communication. Accordingly, the network B is a counter network for the network A; the network A is a counter network for the network B; the controller 100b is a counter network device management unit for the controller 100a; and the controller 100a is a counter network device management unit for the controller 100b.

Accordingly, at steps S907 and S908, the controllers 100a and 100b may function as a network device management information operating unit. Specifically, the controller 100a, used as network device management information operating unit, instructs a counter network device management unit (i.e., controller 100b) to obtain network device management information of the controller 100a; the controller 100b, used as network device management information operating unit, instructs a counter network device management unit (i.e., controller 100a) to obtain network device management information of the controller 100b. The controllers 100a and 100b may function as network device management information operating unit when the CPU 10 executes a program loaded on the RAM 20 (see FIG. 2). Further, the controllers 100a and 100b may be functioned as network device management information transmission unit because network device management information may be transmitted from the controllers 100a or 100b to the counterpart controllers.

With such a configuration, the controller 100a can recognize available services of network devices managed by the controller 100b by communicating with the controller 100b. Further, the controller 100b can recognize available services of network devices managed by the controller 100a by communicating with the controller 100a. Accordingly, the controllers 100a and 100b may function as a available function information acquisition unit. The controllers 100a and 100b may function as the available function information acquisition unit when the CPU 10 executes a program loaded on the RAM 20 (see FIG. 2). Communication device information exchanged in steps S907 and S908 may preferably be information other than user name and corresponding password shown in FIG. 4 in view of network security.

At steps S907 and S908, the controller 100a obtains IP address and port number of the controller 100b by referring URI information of controller 100b from the SIP server 1, by which the controller 100a can transmit information to the controller 100b; the controller 100b obtains IP address and port number of the controller 100a by referring URI information of controller 100a from the SIP server 1, by which the controller 100b can transmit information to the controller 100a.

The controllers 100a and 100b receive communication device information related to the counterpart controller. Then, the controller 100a may identify a given communication device managed by the counterpart controller, which is communicable with a communication device managed by the controller 100a based on "media type" information shown in FIG. 4; the controller 100b may identify a given communication device managed by the counterpart controller, which is communicable with a communication device managed by the controller 100b based on "media type" information shown in FIG. 4. For example, a media type of the viewer 110 (device name: Viewer 1), managed by the controller 100a, is "video/passive." Accordingly, the controller 100a determines that the viewer 110 can communicate with the web camera 7b (device name: NetCam 2) having a media type of "video/active" managed by the controller 100b (counterpart controller). Further, the controller 100a determines that the web camera 7a (device name: NetCam 1) having a media type of "video/active" can communicate with the viewer 110 (device name: Viewer 2) having a media type of "video/passive" managed by the controller 100b (counterpart controller).

Similarly, a media type of the viewer 110 (device name: Viewer 2), managed by the controller 100b, is "video/passive." Accordingly, the controller 100b determines that the viewer 110 can communicate with the web camera 7a (device name: NetCam 1) having a media type of "video/active" managed by the controller 100a (counterpart controller). Further, the controller 100b determines that the web camera 7b (device name: NetCam 2) having a media type of "video/active" can communicate with the viewer 110 (device name: Viewer 1) having a media type of "video/passive" managed by the controller 100a (counterpart controller).

If a network device such as for example web camera 7a is in off-line condition due to power-off or connection shutdown, a video/image communication service cannot be provided. The controllers 100a and 100b access the presence server 3 to check status of each of network devices. With such configuration, the controllers 100a and 100b can determine whether each of communication devices is in a communication-enable condition.

When the controller 100b receives the communication device information from the controller 100a, and recognizes available services as above described, the controller 100b displays content of available services on the LCD 60 of the PC 5b based on received communication device information (step S909). Further, when the controller 100a receives the communication device information from the controller 100b, and recognizes available services as above described, the controller 100a displays content of available services on the LCD 60 of the PC 5a based on received communication device information (step S910). Accordingly, the controllers 100a and 100b may function as a display-information generator. The controllers 100a and 100b may function as the display-information generator when the CPU 10 executes a program loaded on the RAM 20 (see FIG. 2).

Figure 11:
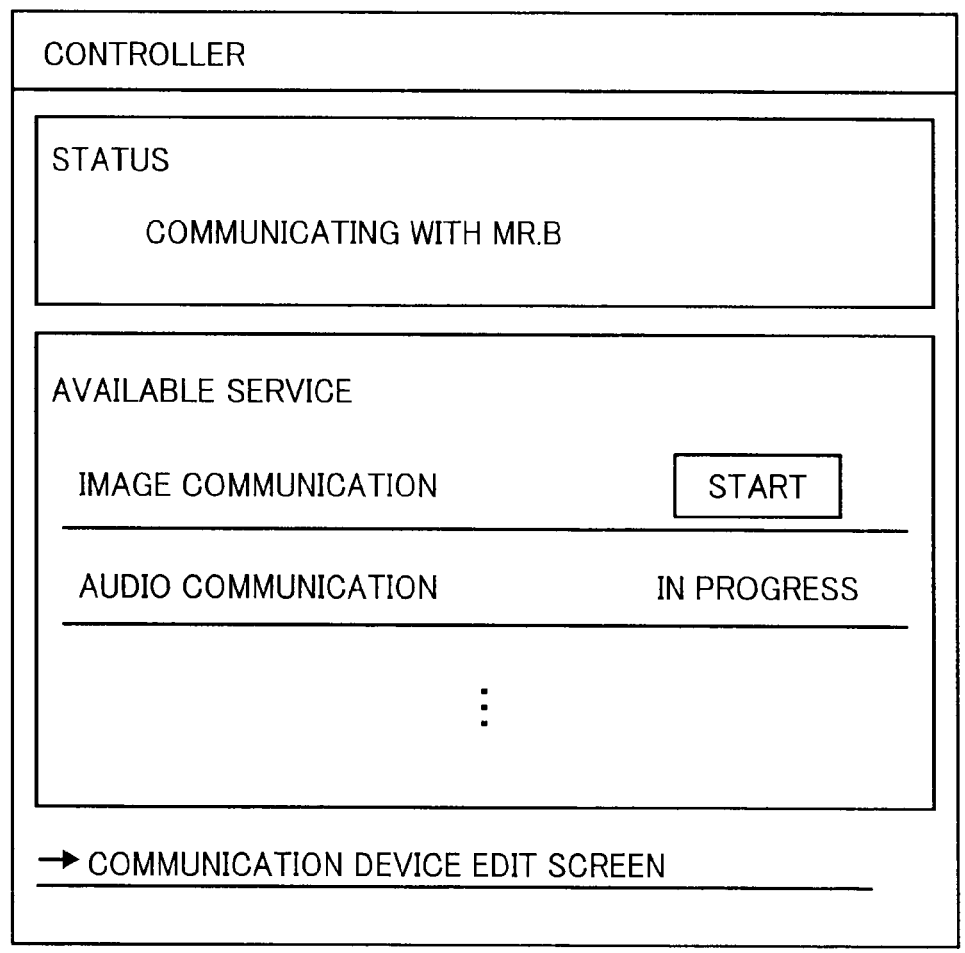
FIG. 11 shows an example GUI (graphic user interface) included in a controller.

FIG. 11 shows an example GUI (graphical user interface), which may be displayed at steps S909 and S910. FIG. 11 shows example GUI for the controller 100. As shown in FIG. 11, GUI of the controller 100 may include status information of a network device, registered as communication device information, and a display portion, which may display information of services available to use, for example. With such a configuration, a user can easily recognize available services after a voice communication using the IP phone 6 has started. Such available services may be referred to as networked-device-function, as required. Further, as shown in FIG. 11, the GUI of the controller 100 may include an interface portion to display an edit screen, which may be used to edit communication device information shown in FIG. 4.

A user can select a networked-device-function by pressing a start button set for the networked-device-function shown in GUI of FIG. 11. For example, a networked-device-function can be executed by clicking a start button set for the networked-device-function. The start button may be used as an "activation switch" to activate the networked-device-function. As such, networked-device-function information may be displayed with corresponding activation switch, for example.

When a user instructs a start of video/image communication by operating the PC 5a, the viewer 110 of PC 5a transmits a connection request to the SIP server 1 based on an instruction of the controller 100a (step S911). At step S911, the viewer 110 requests a connection request to the SIP server 1 by notifying URI information of the controller 100a and URI information of the web camera 7b. The controller 100a may control the viewer 110 using COM (component object model), for example.

When the SIP server 1 receives the connection request, the SIP server 1 obtains IP address and port number corresponding to the notified URI by referring the URI solution information stored in the SIP server 1. Then, the SIP server 1 conducts a session notification to the viewer 110 of PC 5a (hereinafter, the viewer 110a) and the web camera 7b (step S912), by which the viewer 110a and the web camera 7b can start to communicate with each other (step S913, S914).

Further, to conduct an interactive video/image communication, the SIP server 1, which receives the connection request, conducts a session notification to the viewer 110 of PC 5b (hereinafter, the viewer 110b) and the web camera 7a (step S912), by which the viewer 110b and the web camera 7a can start to communicate with each other (step S915, S916).

As above described, in the communication management system according to an example embodiment, the service management server 2 can manage linking of network devices without installing special function to network devices (e.g., PC) used by users. Accordingly, by using the communication management system according to an example embodiment, a network configuration that can link multiple different devices having different communication services can be realized with a simpler configuration.

In the above-described example embodiment, a viewer, an IP phone and a web camera are used as network devices. However, other network devices, which can provide given service via a network can be similarly used as network devices. Further, as above described, an application (e.g., viewer 110) installed in PC can be managed or controlled as a network device.

Further, in the above-described example embodiment, when the SIP server 1 receives a connection request from the viewer 110a of PC 5a, a communication between the viewer 110a and the web camera 7b, and a communication between the viewer 110b and the web camera 7a can be started by using SIP server 1 at step S912. Such process can be conducted by including a connection request between the viewer 110b and the web camera 7a to a connection request from the viewer 110a. Further, an interactive video/image communication can be started using a given function of the service management server 2. A description is now given to such interactive video/image communication using a given function of the service management server 2 with reference to FIG. 12.

Figure 12:
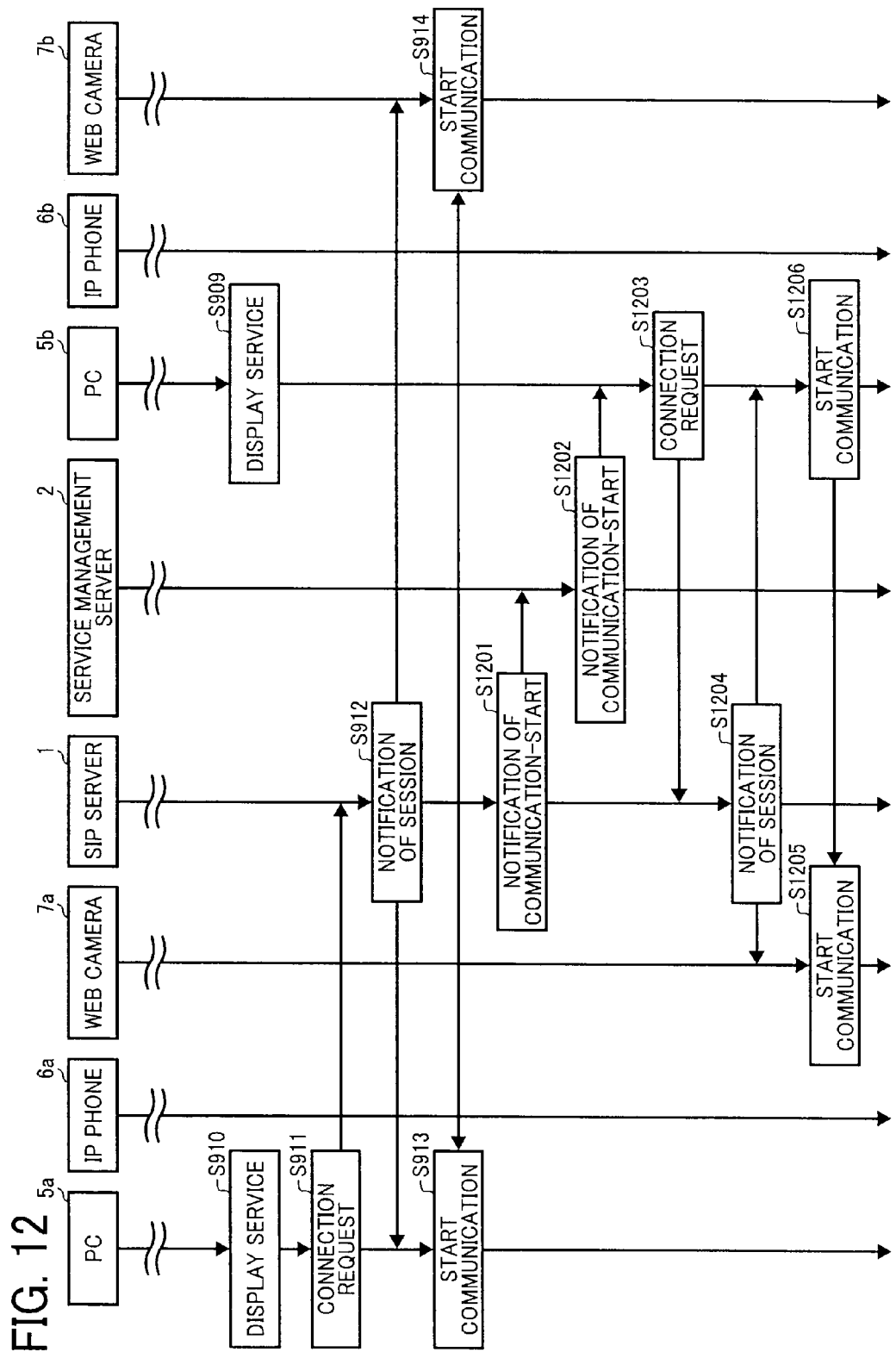
FIG. 12 shows a sequence chart of another example operation process of the communication management system according to a first example embodiment.

FIG. 12 shows a sequence chart of another example operation process of the communication management system, in which process is conducted in a different manner compared to the sequence chart of FIG. 9 after step S911. FIG. 12 shows steps after S910 because steps S901 to S909 shown in FIG. 9 are similarly processed.

When the viewer 110a of PC 5a transmits a connection request (step S911), and the viewer 110a and the web camera 7b start to communicate with each other under the control of SIP server 1 (step S912, S913, S914), the SIP server 1 transmits start of communication to the service management server 2 (step S1201). At step S1201, the SIP server 1 notifies URI information of the viewer 110a and URI information of the web camera 7b to the service management server 2.

Then, the service management server 2 refers to the related-information shown in FIG. 8 to obtain URI information of the controller 100b, which controls the web camera 7b that has started a communication. Then, the service management server 2 notifies to the controller 100b of the PC 5b that the viewer 110a and the web camera 7b have started a video/image communication (step S1202). At step S1202, the service management server 2 obtains IP address and port number assigned to the controller 100b from the SIP server 1 based on URI information of the controller 100b, and notifies the start of communication to the controller 100b.

The controller 100b, which has received a start of video/image communication, controls the viewer 110b in the PC 5b, and transmits a connection request for connecting the viewer 110b with the web camera 7a to the SIP server 1. The viewer 110b transmits a connection request with the web camera 7a to the SIP server 1 under a control of the controller 100b (step S1203). At step S1203, the viewer 110b notifies URI information of the viewer 110b and URI information of the web camera 7a to the SIP server 1.

When the SIP server 1 receives the connection request from the viewer 110b, the SIP server 1 obtains IP address and port number corresponding to the notified URI by referring the URI solution information stored in the SIP server 1. Then, the SIP server 1 conducts a session notification to the viewer 110b and the web camera 7a (step S1204), by which the viewer 110b and the web camera 7a can start to communicate with each other (step S1205, 1206). With such processing, an interactive video/image communication can be easily started as similar to the above-described communication process shown in FIG. 9.

In the first example embodiment, the controller 100 is installed in the PC connected to network devices. In a second example embodiment, the controller 100 is provided in a web server. In the first and second example embodiments, same or similar reference numbers or characters are used for same or similar units, devices, or the like. A description of the second example embodiment is described hereinafter with reference to FIGS. 13 to 16.

Figure 13:
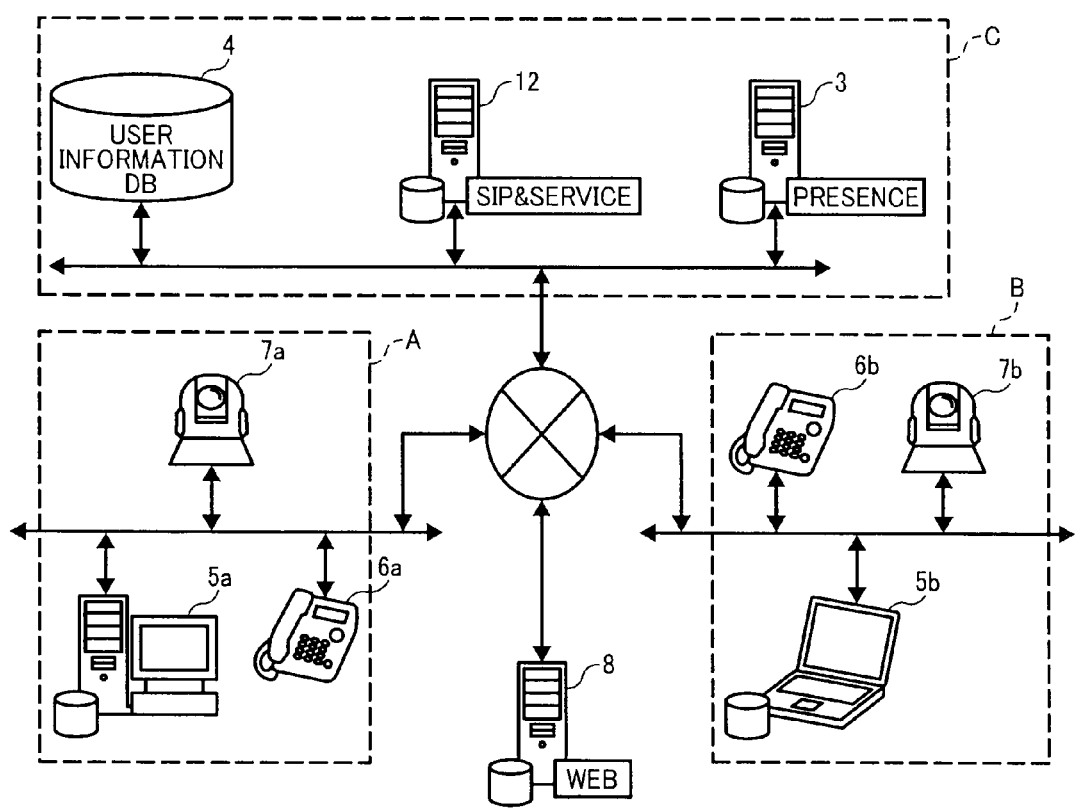
FIG. 13 shows a configuration of communication management system according to a second example embodiment.

FIG. 13 shows an example configuration of the communication management system according to the second example embodiment. As shown in FIG. 13, the communication management system may include a web server 8, which is different from the communication management system shown in FIG. 1. In FIG. 13, the web server 8 may be coupled or connected to a network, which is different from any one of the networks A, B, and C, for example. However, the web server 8 can be included in the network C, which is used as a network for service system provider, for example. Further, in the second example embodiment, a SIP/service management server 12 is provided instead of the SIP server 1 and the service management server 2, wherein the SIP/service management server 12 may include both functions of the SIP server 1 and the service management server 2.

In the second example embodiment, the controller 100 is installed to the web server 8, which is different from the first example embodiment. In such a configuration, a user may use a browser installed in the PC 5a and PC 5b to access the web server 8, by which the user can operate the controller 100.

Figure 14:
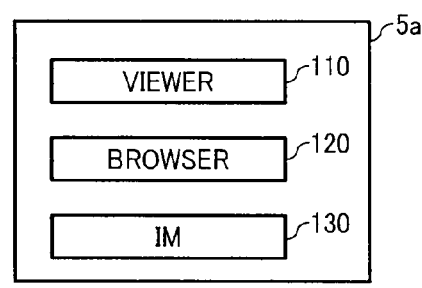
FIG. 14 illustrates a functional configuration of personal computer used in the configuration of FIG. 13.

FIG. 14 shows a functional configuration of the PC 5a. The PC 5b may also have a similar functional configuration. As shown in FIG. 14, the PC 5a may include the viewer 110, a browser 120 and an IM (instant messenger) 130, for example. The viewer 110, the browser 120 and the IM 130 can be used by installing given applications, prepared for each of functions, in the PC 5a, for example.

The browser 120 is a software to access the web server 8 or the like to view website. As above described, in the second example embodiment, a function of the controller 100 may be provided from a website. A user may use the browser 120 installed in the PC 5a to use functions of the controller 100. Accordingly, the user accesses the web server 8 via the browser 120 to register the communication device information (see FIG. 4) to the controller 100 disposed in the web server 8.

The IM 130 of PC 5a may communicate with the IM 130 of PC 5b (counterpart PC) via the SIP/service management server 12 to communicate message information. Such message information exchange may be conducted using MSRP (message session relay protocol) or the like, for example.

Figure 15:
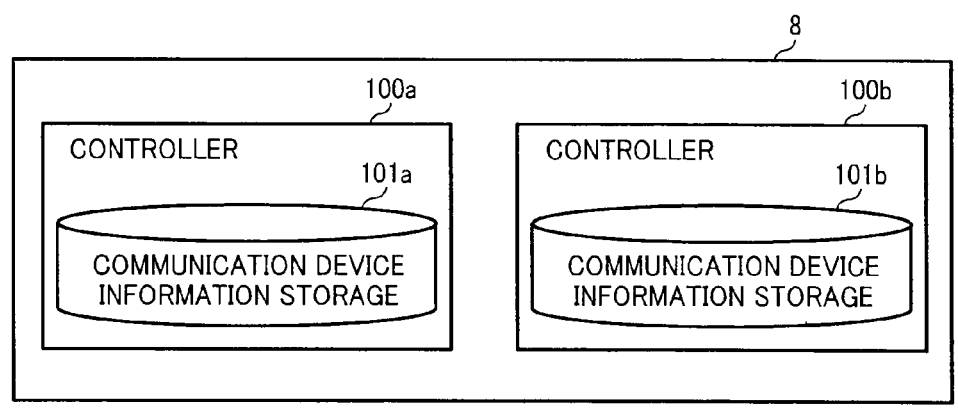
FIG. 15 illustrates a functional configuration of web server used in the configuration of FIG. 13.

A description is now given to a functional configuration of the web server 8 according to the second example embodiment with reference to FIG. 15. As shown in FIG. 15, the web server 8 may include the controller 100a and the controller 100b, for example. The controllers 100a and 100b may include functions similar to the first example embodiment, and respectively control network devices coupled to the networks A and B. The web server 8 may include a hardware configuration as similar to the configuration shown in FIG. 2. However, user interfaces such as LCD 60, operation unit 70, or the like can be omitted from the web server 8.

The controllers 100a and 100b may include the communication device information storage 101a and 101b, used as storage to store information to be used for controlling or managing network devices. The communication device information storage 101a and 101b may store information of network devices (see FIG. 4) included in the networks A and B. For example, the communication device information storage 101a stores information of communication device such as the IP phone 6a and the web camera 7a shown in FIG. 13, and the viewer 110, the browser 120 and the IM 130 shown in FIG. 14. Such communication device may also be referred to as network device.

A description is now given to another example operation process of the communication management system according to the second example embodiment.

After the IM 130 of the PC 5a (hereinafter, IM 130a) and the IM 130 of PC 5b (hereinafter, IM 130b) start to communicate with each other, the communication management system can be switched to voice communication condition, for example. Such switching function is described with reference to FIG. 16.

Figure 16:
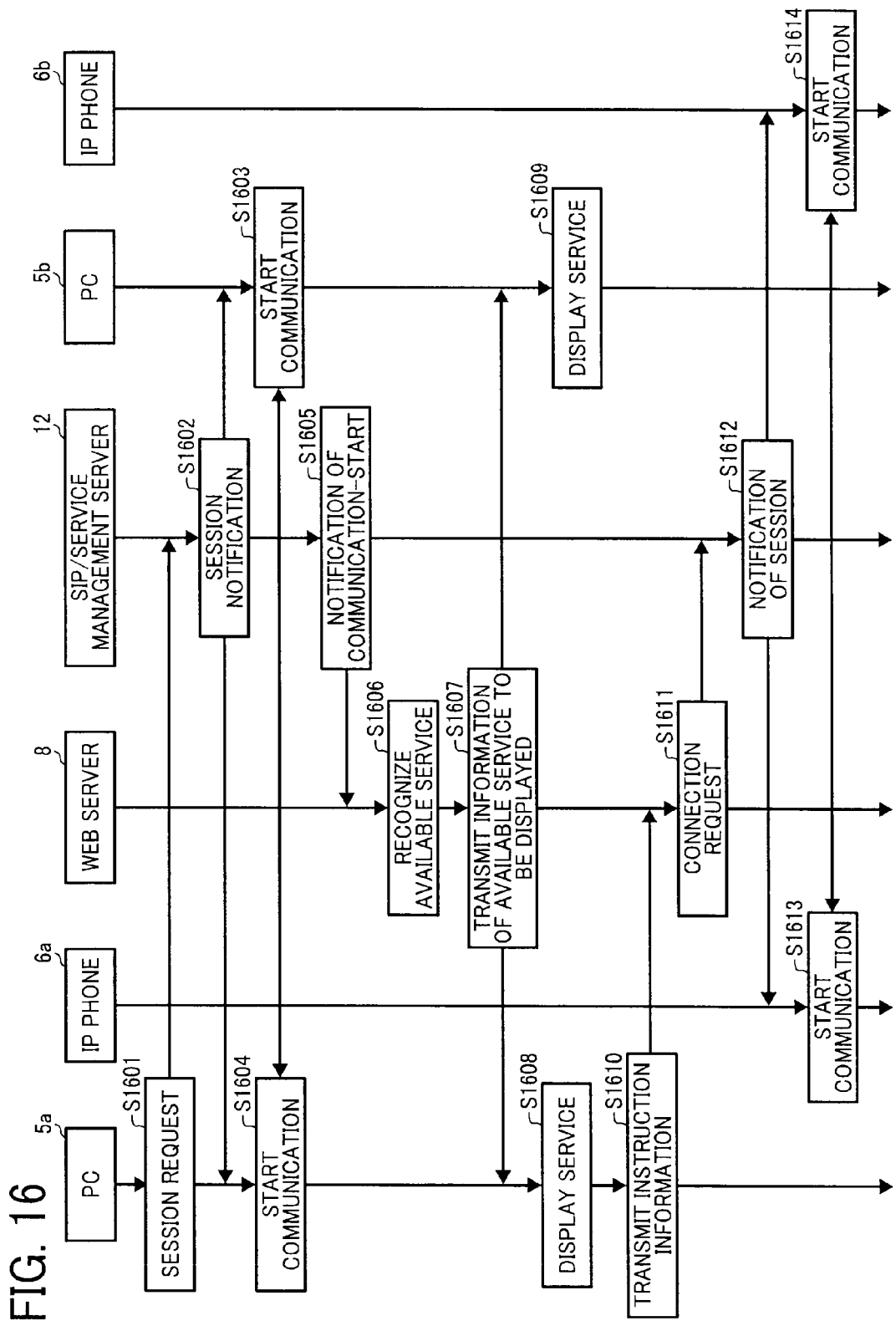
FIG. 16 shows a sequence chart of another example operation process of the communication management system according to a second example embodiment.

FIG. 16 shows a sequence chart of another example operation process of the communication management system, in which the IM 130a installed in the PC 5a may be used as a process-initiation terminal, which transmits a given signal at first. As shown in FIG. 16, the IM 130a transmits a session request to the SIP/service management server 12 (step S1601). Step S1601 is substantially same as step S901 of the first example embodiment.

When the SIP/service management server 12 receives the session request from the IM 130a, the SIP/service management server 12 conducts a session notification to the IM 130a and the IM 130b (step S1602), which is substantially same as step S902, by which the IM 130a and the IM 130b can start to communicate with each other (step S1603, S1604). When the IM 130a and the IM 130b start the communication, the SIP/service management server 12 stores URI information of the IM 130a and the IM 130b as information for indicating terminal devices that is communicating presently, wherein such communication-in-progress device may be shown as information as similar to FIG. 10.

When the SIP/service management server 12 stores URI information of the IM 130a and the IM 130b, the SIP/service management server 12 refers to the related-information shown in FIG. 8 to obtain URI information of the controllers 100a and 100b, which respectively control or manage the IM 130a and the IM 130b. Then, the SIP/service management server 12 notifies to the controllers 100a and 100b, configured in the web server 8, that the IM 130a and the IM 130b has started communication with each other (step S1605).

As above described, the controllers 100a and 100b are included in the web server 8. Accordingly, the SIP/service management server 12 notifies to the web server 8 in appearance at step S1605. However, the controllers 100a and 100b may have different URI. Specifically, the controller 100a and the controller 100b have a same IP address but have different port numbers, for example. Accordingly, at step S1605, the SIP/service management server 12 notifies the start of communication to each of the controllers 100a and 100b.

The controllers 100a and 100b, which have received start of communication between the IM 130a and the IM 130b, conduct steps S908 and S907 of the first example embodiment in the web server 8, and recognize available services (step S1606). Then, the controllers 100a and 100b transmits information of available services to the PC 5a and PC 5b respectively (step S1607), wherein information of available services is to be displayed on the LCD 60, for example.

The PC 5a, which has received information of available services, displays content of available services on the LCD 60 via the browser 120 (step S1608). Further, the PC 5b, which has received information of available services, displays content of available services on the LCD 60 via the browser 120 (step S1609). At steps S1608 and S1609, GUI used in the first example embodiment (see FIG. 11) can be used.

A user operates a GUI displayed on the PC 5a to transmit an instruction information to the controller 100a disposed in the web server 8, wherein such instruction information is used to instruct a start of voice communication, which may use the IP phone 6 (step S1610). Then, the controller 100a recognizes the instruction of starting voice communication between the IP phones 6a and 6b. Then, the controller 100a transmits a connection request for the IP phones 6a and 6b to the SIP/service management server 12 (step S1611). At step S1611, the controller 100a transmits URI information of the IP phones 6a and 6b to request a connection.

When the SIP/service management server 12 receives the connection request, the SIP service management server 12 obtains IP address and port number corresponding to the notified URI by referring URI solution information stored in the SIP/service management server 12. Then, the SIP/service management server 12 conducts a session notification to the IP phones 6a and 6b (step S1612). Then, the IP phones 6a and 6b can start to communicate with each other (step S1613, step S1614). Such IP phones may be controlled or managed using 3PCC (3rd party call control), for example. A phone system having 3PCC function can easily realize the above described example embodiments. When a voice communication using IP phone has started, the communication using the IM 130a and IM 130b may be ended or terminated, as required.

As above described, in the communication management system of the second example embodiment, a web server includes a function of controller 100. Such configuration may not need to add a new device in a user network such as networks A and B, by which such configuration can be realized with simpler configuration.

In a third example embodiment, a function of the web server 8 in the second example embodiment is included in a management server 2. In the first, second, and third example embodiments, same or similar reference numbers or characters are used for same or similar units, devices, or the like. A description of the second example embodiment is described hereinafter with reference to FIGS. 17 to 19.

Figure 17:
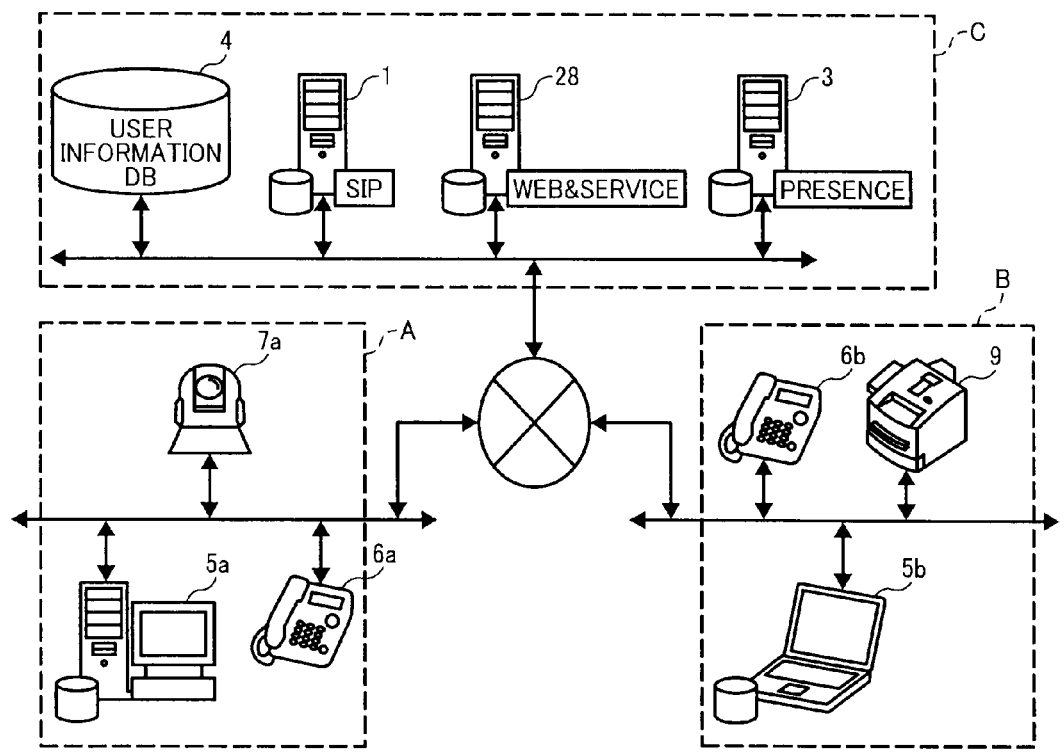
FIG. 17 shows a configuration of communication management system according to a third example embodiment.

FIG. 17 shows a configuration of the communication management system according to the third example embodiment. As shown in FIG. 17, a web/service management server 28, which includes a function of the service management server 2 of the first example embodiment and a function of the web server 8 of the second example embodiment, is provided. Further, a printer 9 may be coupled or connected to the network B as a network device. Other elements are similar as the second example embodiment.

In the third example embodiment, a function of service management server and a function of web server providing a controller are included in a same server, which is the web/service management server 28. Accordingly, a registration process for related-information described in the first example embodiment (see FIG. 6) may not be required because information can be registered to the web/service management server 28 when a user registers communication device information via a browser. FIG. 18 shows example of communication device information. As shown in FIG. 18, the communication device information may include information shown in FIG. 4 and further include "area" information, wherein the "area" indicates a name of network that a given device is disposed.

Figure 19:
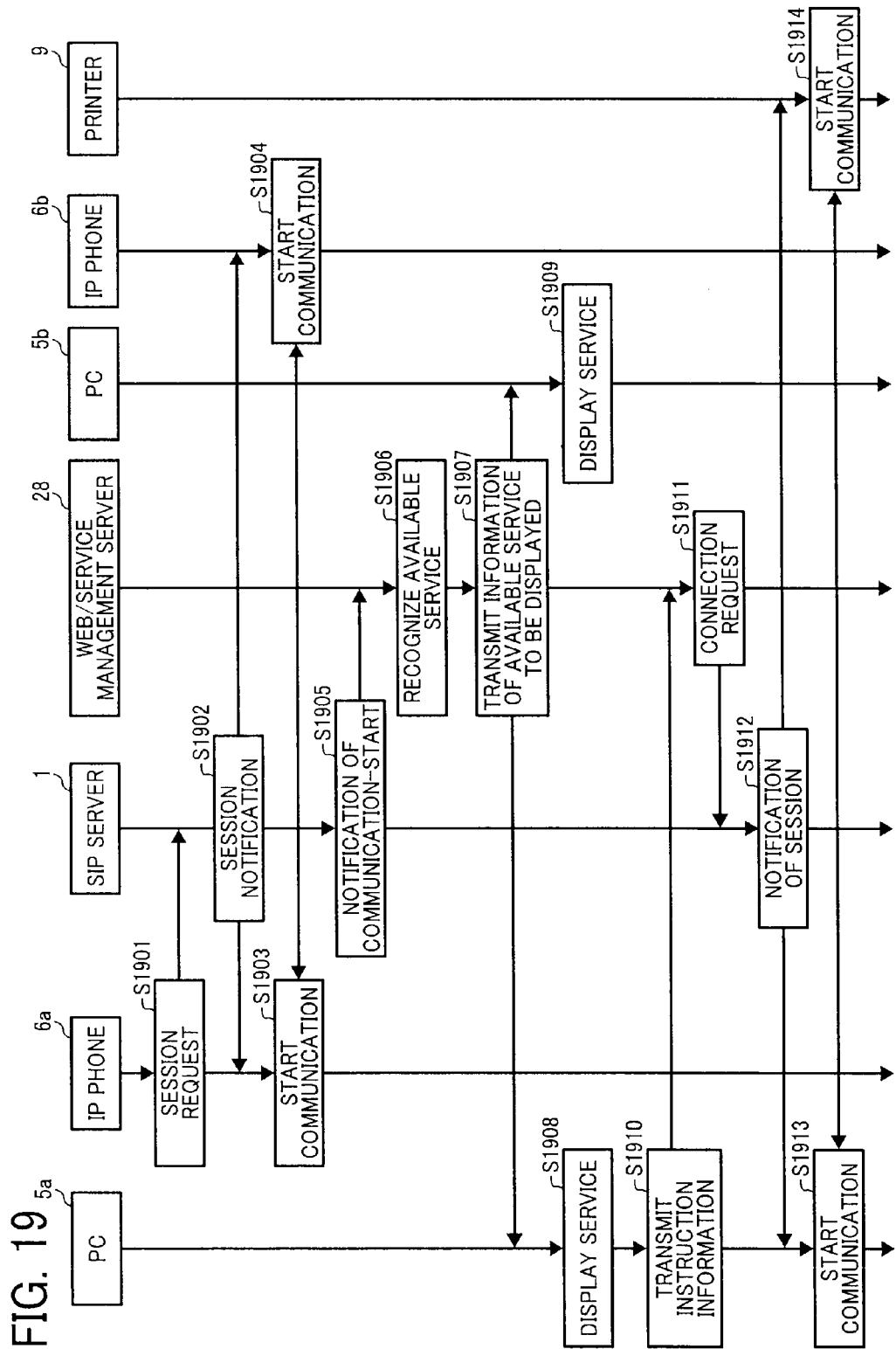
FIG. 19 shows a sequence chart of example operation process operation of the communication management system according to a third example embodiment.

A description is now given to an example operation process of the communication management system according to the third example embodiment with reference to FIG. 19. FIG. 19 shows another sequence chart of the communication management system. As shown in FIG. 19, the process from steps S901 to S904 shown in FIG. 9 for the first example embodiment are conducted until the IP phones 6a and 6b start to communicate (steps S1903, step S1904).

Then, the SIP server 1 notifies to the web/service management server 28 that the IP phones 6a and 6b have started communication with each other (step S1905) as similar to step S905 of FIG. 9.

After receiving such notice of communication-start, as similar to step S1606 in FIG. 16, the web/service management server 28 conducts processes of steps S908 and S907 of the first example embodiment, and recognizes available services (step S1906). Then, the web/service management server 28 transmits information of available services to the PC 5a and PC 5b respectively (step S1907), wherein such information is to be displayed on the LCD 60, for example.

The PC 5a, which has received information of available services, displays content of available services on the LCD 60 via the browser 120 (step S1908). Further, the PC 5b, which has received information of available services, displays content of available services on the LCD 60 via the browser 120 (step S1909). At steps S1908 and step S1909, GUI used in the first example embodiment (see FIG. 11) may be used.

A user operates GUI displayed on the PC 5a to transmit a given instruction information to the web/service management server 28 to confirm status of the printer 9 (step S1910). When the web/service management server 28 receives such instruction information, the web/service management server 28 recognizes an instruction of start of communication between the browser 120 of PC 5a (hereinafter, the browser 120a) and the printer 9. Then, the web/service management server 28 transmits a connection request of the browser 120a and the printer 9 to the SIP server 1 (step S1911).

When the SIP server 1 receives the connection request, the SIP server 1 obtains IP address and port number corresponding to the notified URI by referring URI solution information stored in the SIP server 1. Then, the SIP server 1 conducts a session notification to the browser 120a and the printer 9 (step S1912), by which the browser 120a and the printer 9 can start to communicate with each other (step S1913, S1914).

In the above-described configuration, a user (e.g., service person) of the network A can be informed of the status information of the printer 9. With such a configuration, the user of the network A can easily check the status of the printer 9 after a voice communication has started with another user using the network B. With such a configuration, the user of the network A can monitor the printer 9 effectively, and can conduct support works for the printer 9 efficiently.

Figure 20:
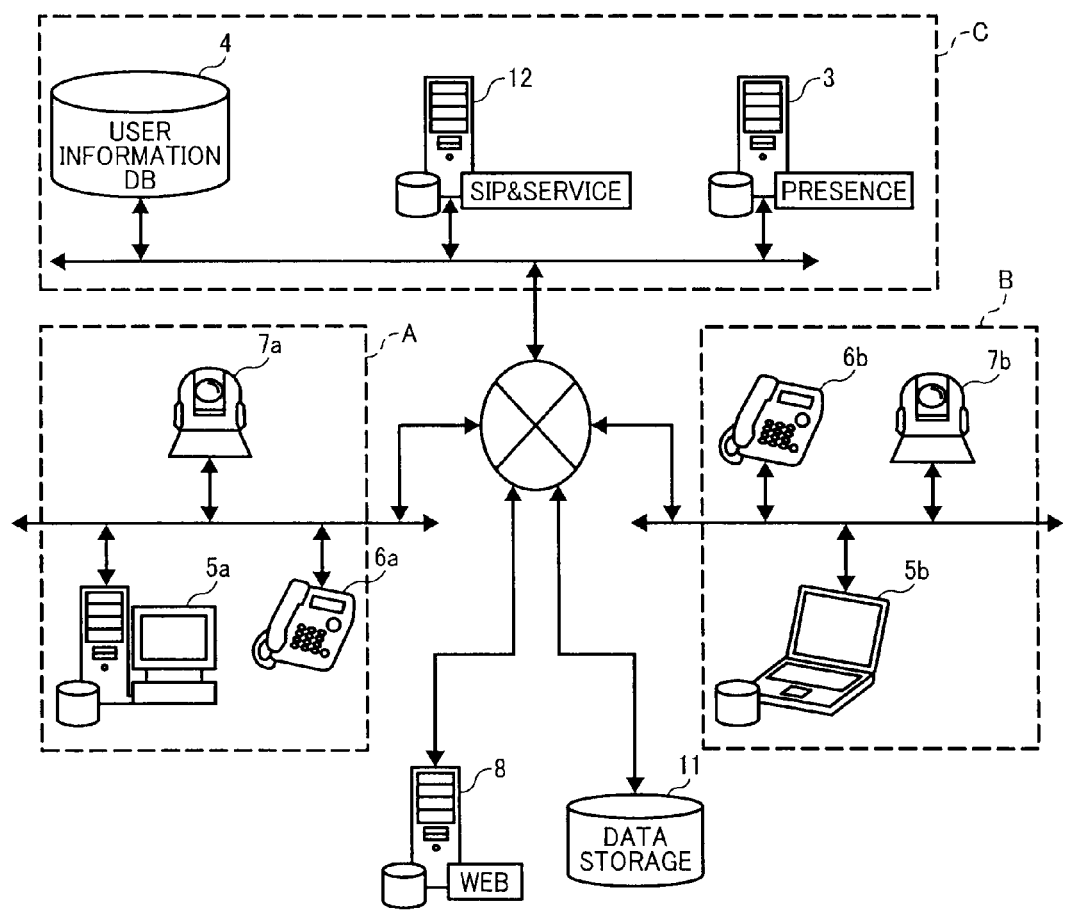
FIG. 20 shows a configuration of communication management system according to a fourth example embodiment.

A description is now given to a fourth example embodiment with reference to FIG. 20. FIG. 20 shows another configuration of communication management system according to the fourth example embodiment, wherein a data storage 11 is connected to a network, which is different from the configuration shown in FIG. 13. For example, the communication device information storage 101a of the controller 100a disposed in the web server 8 stores communication device information set for the data storage 11. In FIG. 20, a user of the PC 5a can use the data storage 11 as a memory device via the browser 120.

As similar to the process of FIG. 16, when the IM 130a and IM 130b start to communicate with each other, the LCD 60 of PC 5b can display that data sharing service using the data storage 11 is available by using functions of the SIP/service management server 12 and the web server 8. As similar to the third example embodiment, URI of the data storage 11 is identified by URL (uniform resource locator). With such a configuration, a user of the PC 5a and another user of the PC 5b can easily share data.

In the first to third example embodiments, services provided by network devices connected to the networks A and B can be shared as above described. In the fourth example embodiment (see FIG. 20), as similar to the first to third example embodiments, consolidated management can be conducted by registering information to a communication device information storage even if the data storage 11 is connected to the Internet as a network device.

As above described, a network configuration, which can link services between multiple different communication devices can be realized with simpler configuration.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A network device management unit to manage a first network device connectable to and operable in a network environment, the first network device communicable with a second network device disposed on the network and managed by a counterpart network device management unit, the second network device used as a counterpart network device for the first network device, the network device management unit comprising:

a device information storage to store network device management information set for the first network device;

a communication-start information acquisition unit to obtain communication-start information when the first and second network devices start to communicate with each other;

a network device management information operation unit to obtain network device management information of the second network device managed by the counterpart network device management unit, after the communication-start information is obtained;

an available function information acquisition unit to obtain available function information, providable by the second network device managed by the counterpart network device management unit, based on the network device management information of the second network device obtained by the network device management information operation unit and the network device management information of the first network device managed by the network device management unit; and a display-information generator to generate networked-device-function information as displayable information based on the obtained available function information, the networked-device-function information corresponding to the obtained available function information, wherein the device information storage stores network device management information that includes at least service information and media type, corresponding to each of a plurality of different devices managed by the network device management unit, and in response to a media type of a device of the plurality of devices included in the network management information stored in the device information storage of the network device management unit and a media type of a counterpart device included in network device management information obtained from the counterpart network device management unit being a same type, the available function information acquisition unit determines that the device and the counterpart device can communicate with each other, and obtains service information of the counterpart device.

2. The network device management unit according to claim 1, further comprising a device management information editor to edit the network device management information stored in the device information storage.

3. The network device management unit according to claim 1, wherein the device information storage stores identification information for identifying the first network device on the network.

4. The network device management unit according to claim 3, wherein the identification information of first network device is correlated with information of address and port number on the network set for the first network device.

5. The network device management unit according to claim 1, wherein the network environment includes a status monitoring server to monitor the status of a network device on the network, wherein the status monitoring server monitors status of the second network device, and when the display-information generator obtains the status information on the second network device from the status monitoring server, the display-information generator generates the networked-device-function information based on the obtained available function information and the status information on the second network device.

6. The network device management unit according to claim 1, wherein the display-information generator generates the networked-device-function information with an activation switch for activating the networked-device-function corresponding to the available function information, and the activation switch is displayable with the networked-device-function information.

7. The network device management unit according to claim 1, wherein the network device management unit is connected to a communication management unit via the network,
wherein the communication management unit manages communication of the first network device and the second network device and transmits the communication-start information,
the communication management unit including a related-information registration unit to register identification information for identifying the network device management unit and identification information for identifying the first network device as related information by correlating the identification information for the network device management unit and the identification information for identifying the first network device.

8. The network device management unit according to claim 1, wherein the network device management unit is connected to a display device to display the networked-device-function information corresponding to the available function information providable by the second network device.

9. The network device management unit according to claim 1, wherein the network device management unit is connected to a signaling server via the network, the first network device and the second network device start to communicate with each other after the signaling server conducts a signaling process, and the communication-start information acquisition unit obtains the communication-start information upon a notification from the signaling server.

10. The network device management unit according to claim 1, wherein the network device management information of the first network device includes at least media type of the first network device, and the network device management information of the second network device includes at least media type of the second network device.

11. The network device management unit according to claim 1, further comprising a display that displays the service information of the counterpart device.

12. A network device management system to manage communication of network devices on a network environment, comprising:
a first network device connected to and operated with the network;
a first network device management unit to manage the first network device;
a second network device, connected to and operated with the network, communicable with the first network device, the second network device being used as a counterpart network device for the first network device;
a second network device management unit to manage the second network device, the second network device management unit being used as a counterpart network device management unit for the first network device management unit;
a communication management unit to notify a communication start between the first network device and the second network device to the first network device management unit,
wherein the first network device management unit includes
a device information storage to store network device management information set for the first network device;
a network device management information receiving unit to receive network device management information of the second network device from the second network device management unit upon a notification from the communication management unit;
an available function information acquisition unit to obtain available function information, providable by the second network device managed by the second network device management unit, based on the network device management information of the second network device received by the network device management information receiving unit and the network device management information of the first network device managed by the first network device management unit; and
a display-information generator to generate networked-device-function information as displayable information based on the obtained available function information, the networked-device-function information corresponding to the obtained available function information, wherein
the device information storage stores network device management information that includes at least service information and media type, corresponding to each of a plurality of different devices managed by the first network device management unit, and
in response to a media type of a device of the plurality of devices included in the network management information stored in the device information storage of the first network device management unit and a media type of a counterpart device included in network device management information obtained from the second network device management unit being a same type, the available function information acquisition unit determines that the device and the counterpart device can communicate with each other, and obtains service information of the counterpart device.

13. The network device management system according to claim 12, wherein the communication management unit includes a related-information storage to store related-information correlating the first network device management unit and the first network device, and when the communication management unit recognizes start of communication between the first network device and the second network device, the communication management unit notifies the start of communication between the first network device and the second network device to the first network device management unit by referring to the related-information.

14. The network device management system according to claim 13, wherein the first network device management unit transmits identification information for identifying the first network device management unit and identification information for identifying the first network device to the communication management unit,
when the communication management unit receives the identification information for the first network device management unit and the identification information for the first network device, the communication management unit stores the identification information for the first network device management unit and the identification information for the first network device as the related information in the related-information storage.

15. The network device management system according to claim 14, further comprising a verification information storage to store verification information of the first network device,
wherein the communication management unit obtains the verification information of the first network device from the first network device management unit, checks management authority of the first network device by comparing the verification information stored in the verification information storage and the verification information obtained from the first network device management unit, and stores the related information to the related-information storage when the communication management unit verifies the management authority of the first network device based on the comparison of verification information.

16. The network device management system according to claim 13, further comprising a signaling server on the network,
wherein the first network device and the second network device start to communicate with each other after the signaling server conducts a signaling process, and
the communication management unit recognizes the start of communication between the first network device and the second network device after the signaling server conducts the signaling process.

17. The network device management system according to claim 12, wherein the display-information generator generates an activation switch for requesting operation of the networked-device-function as displayable information for activating the networked-device-function corresponding to the available function information, and
the display-information generator generates the networked-device-function information with the activation switch for activating the networked-device-function corresponding to the available function information of the second network device, managed by the second network device management unit.

18. The network device management system according to claim 17, further comprising a signaling server on the network,
wherein the first network device and the second network device start to communicate with each other after the signaling server conducts a signaling process,
the display-information generator generates the networked-device-function information with the activation switch, in which start of communication is requestable to the signaling server by operating the activation switch, and
when the signaling server receives the request of start of communication, the signaling server requests activation of the networked-device-function to the second network device managed by the second network device management unit.

19. The network device management system according to claim 12, wherein the network device management information of the first network device includes at least media type of the first network device, and the network device management information of the second network device includes at least media type of the second network device.

20. A communication management unit for managing communication between a first network device and a second network device connected to and operated with a network environment, the first network device and the second network device managed respectively by a first network device management unit and a second network device management unit, the communication management unit comprising:
a communication-start information acquisition processing circuit to obtain communication-start information indicating start of communication between the first network device and second network device;
an available function information acquisition processing circuit to obtain available function information, providable by the first and second network devices based on network device management information of the first network device managed by the first network device management unit and network device management information of the second network device managed by the second network device management unit, after the communication-start information is obtained; and
a transmission processing circuit to transmit the obtained available function information to the first network device management unit and the second network device management unit, wherein
the first network device management unit stores network device management information that includes at least service information and media type, corresponding to each of a plurality of different devices managed by the first network device management unit, and
in response to a media type of a device of the plurality of devices included in the network management information stored at the first network device management unit and a media type of a counterpart device included in network device management information obtained from the second network device management unit being a same type, the available function information acquisition processing circuit determines that the device and the counterpart device can communicate with each other, and obtains service information of the device and the counterpart device.

21. The communication management unit according to claim 20, further comprising a related-information storage storing related-information correlating the first network device management unit and the first network device, and related-information correlating the second network device management unit and the second network device,
wherein when the communication-start information acquisition processing circuit obtains the communication-start information, the transmission processing circuit transmits the communication-start information to at least one of the first network device management unit and the second network device management unit by referring to the related-information.

22. The communication management unit according to claim 21, wherein the communication management unit is connected to a signaling server via the network,
wherein the first network device and the second network device start to communicate with each other after the signaling server conducts a signaling process, and
the communication-start information acquisition processing circuit obtains the communication-start information after the signaling server conducts the signaling process.

23. The communication management unit according to claim 20, wherein the network device management information of the first network device includes at least media type of the first network device, and the network device management information of the second network device includes at least media type of the second network device.

* * * * *